(12) United States Patent
Wang et al.

(10) Patent No.: US 10,751,877 B2
(45) Date of Patent: Aug. 25, 2020

(54) INDUSTRIAL ROBOT TRAINING USING MIXED REALITY

(71) Applicant: ABB Schweiz AG, Baden (CH)

(72) Inventors: Jianjun Wang, West Hartford, CT (US); Remus Boca, Simsbury, CT (US); Biao Zhang, West Hartford, CT (US); Carlos Martinez, South Windsor, CT (US); Thomas Fuhlbrigge, Ellington, CT (US)

(73) Assignee: ABB Schweiz AG, Baden (CH)

( * ) Notice: Subject to any disclaimer, the term of this patent is extended or adjusted under 35 U.S.C. 154(b) by 332 days.

(21) Appl. No.: 15/902,142

(22) Filed: Feb. 22, 2018

(65) Prior Publication Data

US 2019/0202055 A1 Jul. 4, 2019

Related U.S. Application Data

(60) Provisional application No. 62/612,585, filed on Dec. 31, 2017.

(51) Int. Cl.
*B25J 9/16* (2006.01)
*G06T 19/00* (2011.01)
*H04N 7/18* (2006.01)

(52) U.S. Cl.
CPC .......... *B25J 9/1666* (2013.01); *B25J 9/1671* (2013.01); *B25J 9/1697* (2013.01); *G06T 19/003* (2013.01);
(Continued)

(58) Field of Classification Search
CPC ...... B25J 9/1666; B25J 9/1671; B25J 9/1697; G06T 19/006; G06T 19/003; H04N 7/183;
(Continued)

(56) References Cited

U.S. PATENT DOCUMENTS 7,714,895 B2   5/2010   Pretlove et al.
9,643,314 B2 * 5/2017   Guerin ................. B25J 9/1605
(Continued)

OTHER PUBLICATIONS

Lee et al, Construction of a computer-simulated mixed reality environment for virtual factory layout planning, Jan. 2011, Elsevier, Computers in Industry, vol. 62, Issue 1, pp. 86-98. (Year: 2011).*
(Continued)

*Primary Examiner* — Jaime Figueroa
(74) *Attorney, Agent, or Firm* — J. Bruce Schelkopf; Taft Stettinius & Hollister LLP

(57) ABSTRACT

Unique systems, methods, techniques and apparatuses of a robot training system are disclosed. One exemplary embodiment is an industrial robot training system comprising a mixed reality display device structured to superimpose a virtual scene on a real-world view of a real-world scene including a plurality of physical objects including an industrial robot, a video input device, and a computing device. The computing device is structured to detect physical objects using video output from the video input device, generate virtual objects using the detected physical objects, simulate a virtual robot path, determine one movement of the series of robot movements causes a collision, adjust the virtual robot path so as to avoid the collision between the two virtual objects of the plurality of virtual objects, and program the industrial robot to perform a real robot path using the adjusted virtual robot path.

18 Claims, 3 Drawing Sheets

(52) U.S. Cl.
CPC ........... *G06T 19/006* (2013.01); *H04N 7/183* (2013.01); *Y10S 901/09* (2013.01); *Y10S 901/47* (2013.01)

(58) Field of Classification Search
CPC ................. Y10S 901/47; Y10S 901/09; G05B 2219/40317
USPC .................................................. 700/245, 253
See application file for complete search history.

(56) References Cited

U.S. PATENT DOCUMENTS

| | | | | |
|---|---|---|---|---|
| 2011/0029903 | A1* | 2/2011 | Schooleman | H04N 13/239 715/764 |
| 2012/0146894 | A1* | 6/2012 | Yang | G09B 5/06 345/156 |
| 2016/0257000 | A1* | 9/2016 | Guerin | B25J 9/1605 |
| 2017/0165841 | A1 | 6/2017 | Kamoi | |
| 2018/0089349 | A1* | 3/2018 | Rezgui | G06F 40/137 |
| 2018/0285052 | A1* | 10/2018 | Eade | G06F 3/04815 |
| 2019/0259205 | A1* | 8/2019 | Nissinen | G06F 3/016 |

OTHER PUBLICATIONS

Gogouvitis et al, Construction of a virtual reality environment for robotic manufacturing cells, 2015, ResearchGate, International Journal of Computer Applications in Technology • vol. 51, No. 3, pp. 173-184 (Year: 2015).*
Frank et al, Toward Mobile Mixed-Reality Interaction With Multi-Robot Systems, Oct. 2017, IEEE Robotics and Automation Letters, vol. 2, No. 4, pp. 1901-1908 (Year: 2017).*
Hönig et al, Mixed Reality for Robotics, 2015 IEEE/RSJ International Conference on Intelligent Robots and Systems (IROS) Congress Center Hamburg, Sep. 28-Oct 2, 2015. Hamburg, Germany, pp. 5382-5387 (Year: 2015).*
Frank et al, Realizing Mixed-Reality Environments with Tablets for Intuitive Human-Robot Collaboration for Object Manipulation Tasks, 2016, 25th IEEE International Symposium on Robot and Human Interactive Communication (RO-MAN), Aug. 26-31, 2016, Columbia University, NY, USA, pp. 302-307 (Year: 2016).*
Frank et al, Mobile Mixed-Reality Interfaces That Enhance Human—Robot Interaction in Shared Spaces, Jun. 2017, Frontiers in Robotics and AI, vol. 4, Article 20, pp. 1-14 (Year: 2017).*

* cited by examiner

INDUSTRIAL ROBOT TRAINING USING MIXED REALITY

CROSS REFERENCE TO RELATED APPLICATION

This application claims priority under 35 U.S.C. 119(e) from U.S. provisional patent application No. 62/612,585 filed on Dec. 31, 2017, entitled "Industrial Robot Training Using Mixed Reality" which is hereby incorporated by reference in its entirety.

BACKGROUND

The present disclosure relates generally to training an industrial robot. To teach a robot to perform intended tasks, a user currently has to use either offline software, such as Robot Studio, or an online device, such as a teach pendant, or a combination of both, to create a program, test it, and tune it. Existing robot training systems suffer from a number of shortcomings and disadvantages. There remain unmet needs including decreasing robot program creation, debugging, and testing complexity. For instance, robot training currently requires familiarity with robot programming language and software tools. Users must understand mathematically abstracted concepts, such as coordinate frames, and their transformation relations in order to effectively program the robot. Once a robot program is in service, it is difficult to troubleshoot since simulations of the robot program cannot be visualized in a real scene. There is a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY

Exemplary embodiments include unique systems, methods, techniques and apparatuses for robot training using mixed reality. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
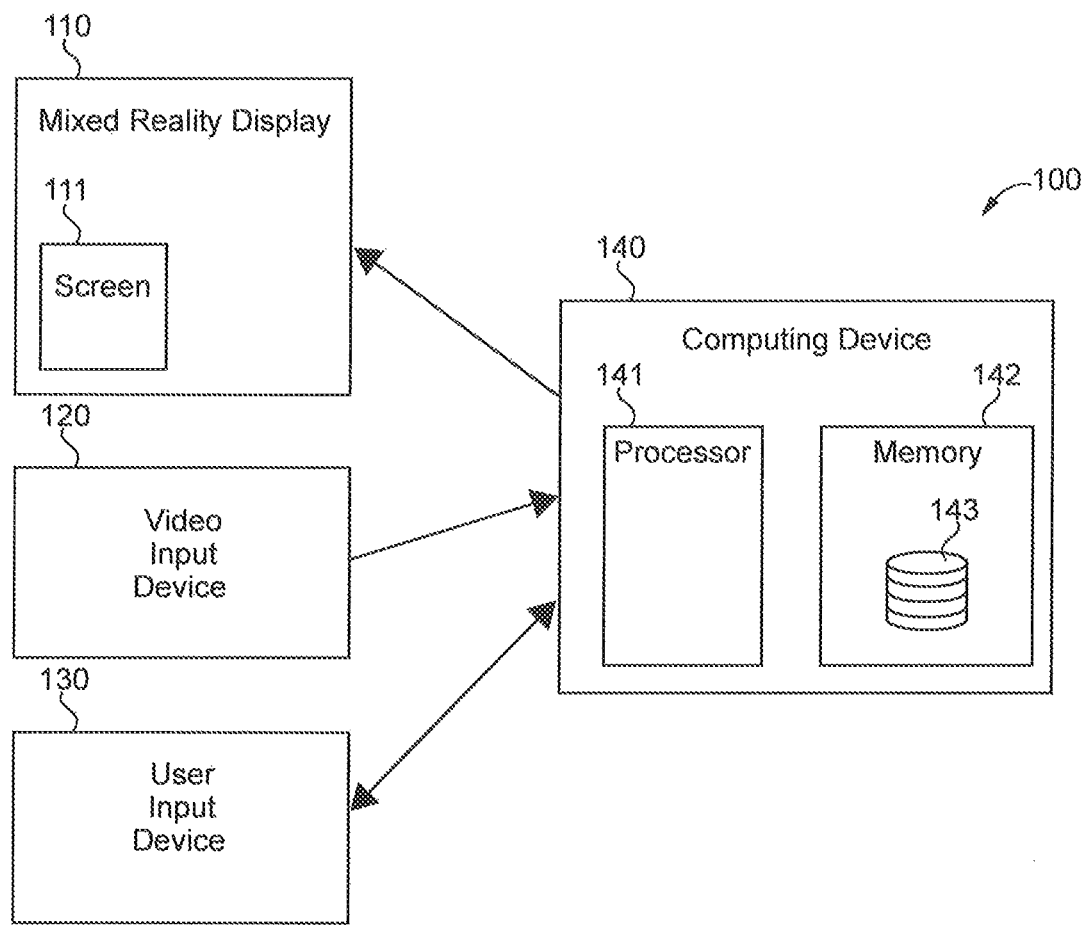
FIG. 1 is a box diagram illustrating an exemplary industrial robot training system.

With reference to FIG. 1, there is illustrated an industrial robot training system 100. It shall be appreciated that system 100 may be implemented in a variety of applications. For example, system 100 may be implemented in industrial plants with an assembly line or other factory facilities, refineries, electrical substations, electrical generation plants, wind farms, solar farms, pharmaceutical plants, and other environments where industrial robots are present.

System 100 is structured to apply mixed reality techniques in order to train an industrial robot. Training may include controlling, programming, visualizing, and simulating the industrial robot. System 100 includes a mixed reality display 110, a video input device 120, a user input device 130, and a computing device 140.

Mixed reality display 110 includes a screen 111 viewable by a user. Screen 111 is transparently structured to allow a user to view a real-world scene, which includes a plurality of physical objects. For example, screen 111 may be partially comprised of glass or clear plastic. Screen 111 is structured to superimpose a virtual scene on the user's view of the real-world scene. The virtual scene includes one or more virtual objects. The virtual objects may be represented as holographic images of 3D objects or screen elements, to name but a few examples. In certain embodiments, one of the superimposed virtual objects is an industrial robot.

In certain embodiments, screen 111 displays one of the superimposed virtual objects being moved by a virtual industrial robot or a real industrial robot. The virtual robot may be aligned with a physical industrial robot visible through screen 111. The virtual robot may be moved cartesianally or rotated at a joint of the virtual robot.

Screen elements may include virtual position objects representing a position that the physical robot is programmed to move to, virtual path objects representing a trajectory the physical robot is programmed to move along, a virtual action object corresponding to a specific portion of the robot program configured to be controllable so as to affect the implementation of the robot program, or a virtual command object that the user can select to perform certain operations, to name but a few examples. The virtual command object may be a button selectable by a user using the user input device in order to pause or otherwise control a simulation being displayed on screen 111.

Video input device 120 is structured to capture the real-world scene and output a video depicting the real-world scene to a computing device 140. In certain embodiments, video input device 120 is a 2D camera or a 3D camera.

User input device 130 is structured to receive input, also known as commands, from a user effective to manipulate the superimposed virtual scene on screen 111. User input device 130 may be one or more handheld devices. User input device 130 may include buttons, switches, and joysticks. User input device 130 may provide haptic feedback to the user in response to receiving certain commands. User input device 130 may include dedicated inputs for safety such as an emergency button. User input device 130 may receive commands by detecting movement of device 130 using an inertia measurement unit (IMU).

In certain embodiments, user input device 130 is structured to receive commands to be processed with computing device 140 by capturing hand gestures or head movement of a user using video input device 120. For example, device 130 may receive commands effective to manipulate real or virtual objects with hand gestures, gaze motion, and head motion, such as generating a virtual robot path. A virtual object may be manipulated with hand gestures so as to select, move, or pin a virtual object to a physical object. The virtual object may be pinned to and moved with the physical object, or pinned to the user and moved with user movement. For example, a user may use hand gestures to pin a virtual object to the tool of a real industrial robot viewable in screen 111. Once pinned, the virtual object moves on screen 111 whenever the real industrial robot tool moves.

In certain embodiments, manipulation of the virtual scene displayed on screen 111 includes adding, deleting, and repositioning virtual objects; pinning a virtual object onto a physical object; moving a virtual industrial robot to another location within the virtual scene; moving a joint of a virtual industrial robot; creating a virtual element of a virtual object corresponding to a position of a virtual industrial robot; generating a virtual robot path by moving the virtual industrial robot within the virtual scene; and adjusting a virtual object or virtual robot path in response to observing a collision during a virtual robot path simulation, to name but a few examples.

In certain embodiments, mixed reality display 110, video input device 120, and user input device 130 are combined into a single mixed reality device. For example, the mixed reality device may be Microsoft's HoloLens, Magic Leap's One, or another mixed reality device including a wearable device with a transparent screen.

Computing device 140 is structured to receive video input from video input device 120, receive user input from user input device 130, detect physical objects from the video output, generate virtual objects corresponding to the physical objects, determine changes to the virtual scene indicated by the user input, and transmit data to mixed reality display 110 corresponding to a modified representation of the virtual scene output by screen 111. In certain embodiments, computing device 140 is remote from the user, such as a cloud-based computing device or a remote server. Computing device 140 performs the back end computation for the other devices of system 100, such as processing tasks related to object recognition, motion planning, and simulation.

Computing device 140 includes a processor 141 and a memory device 142. Processor 141 is structured to execute instructions stored on memory device 142 effective to display the virtual scene on screen 111 to the user. Memory device 142 includes a virtual object database 143 including data related to a plurality of virtual objects. Real-world objects identified by computing device 140 using video output from video input device 120 are converted to virtual objects and stored in database 143. In certain embodiments, database 143 includes virtual objects not detected by the video output from the video input device. For example, virtual objects may be preloaded into database 143 using CAD models, or segmented 2D or 3D images of physical objects. In certain embodiments, a virtual object includes a point cloud representation of a real-world object.

For virtual objects represented in the virtual scene using screen 111, database 143 includes corresponding virtual elements such as location, pin status, and appearance information. In certain embodiments, virtual objects are stored in templates of virtual scenes and screen 111 is populated by aligning the template of virtual objects with the physical objects of the real-world scene.

Using data stored in the database 143, computing device 140 is structured to simulate a virtual robot path which may include a virtual or real industrial robot moving a virtual object. The simulation may be visualized by transmitting virtual scene data to display 110. Virtual scene data includes the location of virtual objects within the virtual scene and whether a virtual object is pinned to another virtual object or a real object. It shall be appreciated that any or all of the foregoing features of system 100 may also be present in the other robot training systems disclosed herein.

Figure 2:
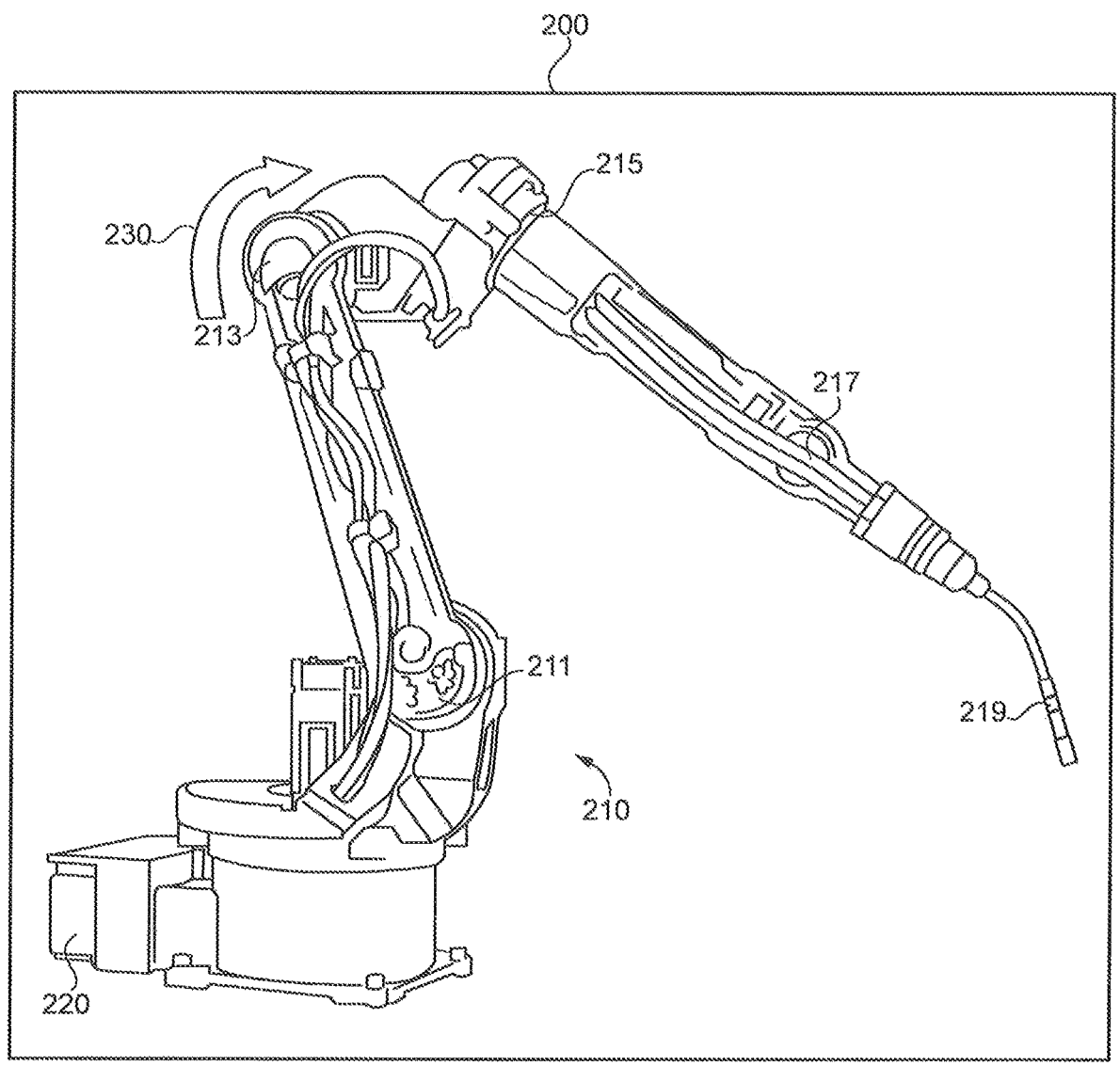
FIG. 2 illustrates a view through a mixed reality display of an industrial robot from the perspective of a user.

With reference to FIG. 2, there is illustrated a view 200 through an exemplary screen, such as screen 111 of robot training system 100 in FIG. 1. View 200 is directed to a real industrial robot 210, a real robot controller 220, and a virtual screen element 230.

Industrial robot 210 includes a plurality of controllable joints 211, 213, 215, and 217. Robot 210 also includes a tool 219. In other embodiments, robot training system 100 may pin a virtual robot component to a real robot. For example, system 100 may pin and display a virtual tool onto a real robot lacking a real tool.

Industrial robot controller 220 is structured to operate robot 210 by controlling the controllable components of robot 210, such as the joints and tool. In certain embodiments, controller 220 is structured to receive commands from robot training system 100 effective to allow a user to control robot 210 in real time using user input device 130.

System 100 is structured to program controller 220 using input from user input device 130. For example, a user may select joint 213 with a hand gesture captured by user input device 130. In response, screen 111 displays screen element 230. The user may then select screen element 230 using hand gestures in order to jog joint 213. User input received by user input device 130 corresponds to desired jogging direction and distance. Robot 210 may also be jogged by axes or in Cartesian frame. When the user enters multiple commands related to a series of movements by the robot, the user generates a virtual robot path which can be used to program robot 210, and may be simulated or visualized by system 100.

In certain embodiments, a user may select tool 219. In response, screen 111 displays a screen element for tool jogging. Using user input device 130, the user indicates jogging directions and distance.

In other embodiments, robot 210 is entirely virtual. A user may generate a program for a real robot by manipulating a virtual version of robot 210. The program may be simulated and visualized using system 100.

Figure 3:
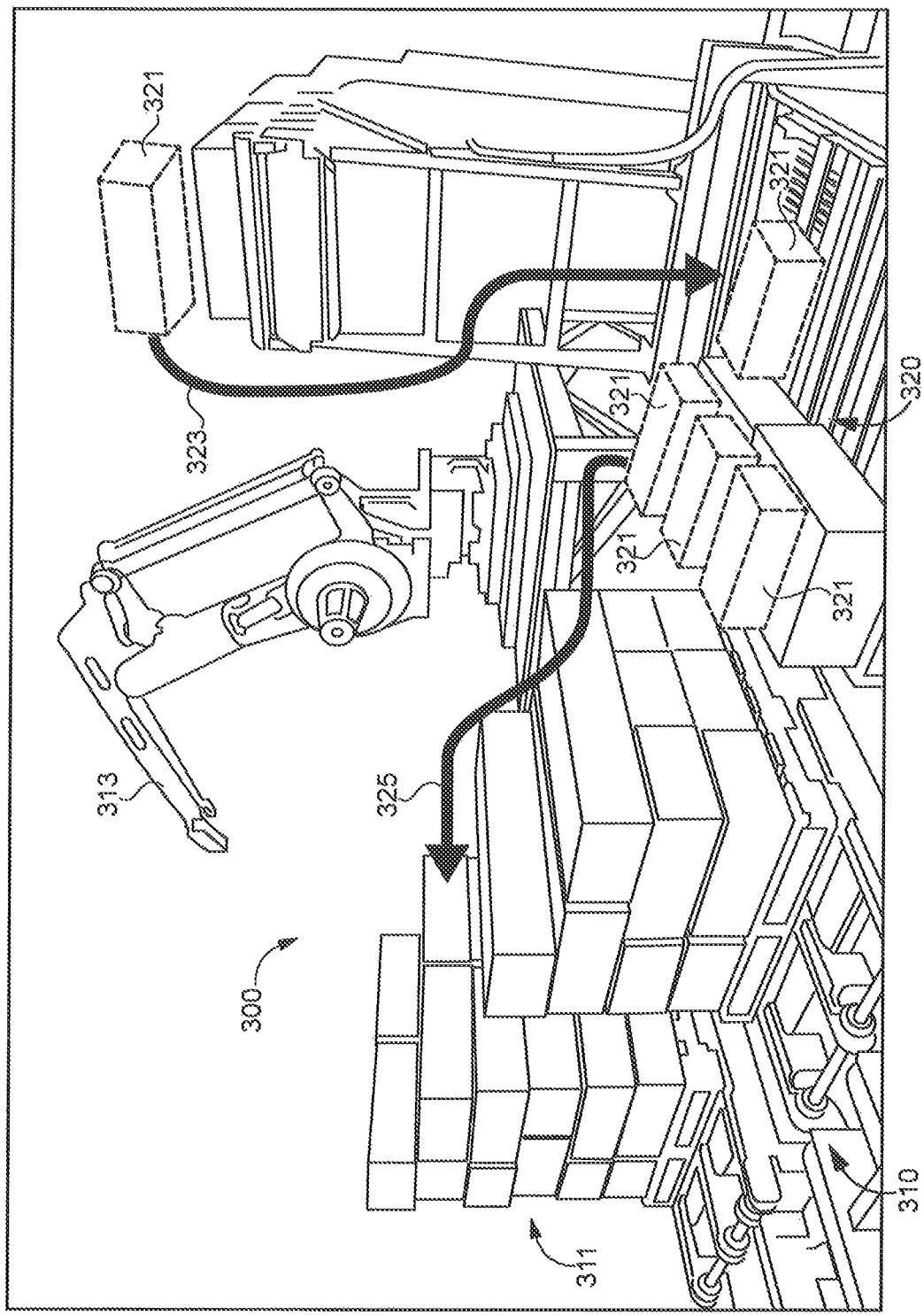
FIG. 3 illustrates a view through a mixed reality display of an industrial work scene from the perspective of a user.

With reference to FIG. 3, there is illustrated a view 300 through a mixed reality display, such as mixed reality display 110, of robot training system 100 in FIG. 1. View 300 includes a real scene 310 and a virtual scene 320 superimposed on real scene 310. In the illustrated embodiment, real scene 310 includes an industrial robot 313 and a plurality of real boxes 311. Virtual scene 320 includes a plurality of virtual boxes 321, a valid robot path 323, and an invalid robot path 325.

In order to superimpose virtual scene 320 onto real scene 310, computing device 140 first converts each physical object of real-world scene 310 into a virtual object. The virtual object of each physical object is used to generate modifications to the virtual scene but may not be displayed by screen 111.

In certain embodiments, a user may replicate a physical object in view 300 and add the replicate to the virtual scene 320. For example, using user input device 130, a user may select one of the plurality of real boxes 311, convert the real box to a virtual box, and add a virtual box to virtual scene 320. In the illustrated embodiment, the user has replicated one box of the plurality of real boxes 311 and placed a plurality of virtual boxes 321 within virtual scene 320. Once added to the virtual scene, the user may manipulate the boxes to generate a virtual robot path of robot 313. For example, the user may generate a smooth path, such as path 323, using user input device 130 effective to program an industrial robot 313 to move real boxes which will be located at the locations of virtual boxes 321.

In certain embodiments, view 300 may visualize the simulation of a robot path. For example, screen 111 may visualize industrial robot 313 moving along robot paths 323 and 325. Visualization using screen 111 includes aligning virtual objects displayed on screen 111 with corresponding physical objects in the real-world scene. Screen 111 outputs a virtual representation of robot 313 moving one of the virtual boxes 321. In other embodiments, screen 111 may visualize a virtual robot moving a virtual representation of a real object, such as one of the real boxes 311.

Simulation and visualization by system 100 may be used to detect invalid robot paths for debugging robot programs. For example, when screen 111 displays a virtual representation of robot 313 moving along current path 325, the user sees a collision between one of the real boxes 311 and the virtual representation of robot 313. Similarly, computing device 140 detects a collision between the virtual object corresponding to the real industrial robot and the virtual object corresponding to one of the real boxes 311. In response, computing device 140 or the user may modify robot path 325 to avoid a future collision, or delete path 325 and add a new robot path. The computing device or the user may modify robot path 325 by adding, modifying or deleting one or more robot positions along the robot path. Once adjusted, virtual robot path 325 may then be used to program robot 313 for real-world operation. In certain embodiments, robot path simulation may be performed by computing device 140 without visualization by screen 111.

Further written description of a number of exemplary embodiments shall now be provided. One embodiment is an industrial robot training system comprising a mixed reality display device structured to superimpose a virtual scene on a real-world view of a real-world scene including a plurality of physical objects; a video input device structured to capture the real-world scene and output a video depicting the real-world scene; and a computing device structured to detect the plurality of physical objects using the video output from the video input device, generate a first plurality of virtual objects using the plurality of detected physical objects, simulate a virtual robot path of an industrial robot within the real-world scene using a second plurality of virtual objects, the virtual robot path including a series of robot movements, determine one movement of the series of robot movements causes a collision between two of the virtual objects of the second plurality of virtual objects, adjust the virtual robot path so as to avoid the collision between the two virtual objects of the plurality of virtual objects, and program the industrial robot to perform a real robot path using the adjusted virtual robot path.

In certain forms of the foregoing industrial robot training system, the system comprises a user input device structured to receive commands from a user, and wherein the computer device is structured to simulate the virtual robot path in response to receiving commands from the user. In certain forms, the commands received from the user input device are effective to cause the computing device to manipulate the virtual scene output by the mixed reality display device by adding, deleting, or moving virtual objects or adding, deleting, or moving virtual robot paths, wherein moving virtual objects includes moving a joint of a virtual industrial robot or moving an entire industrial robot from a first location of the virtual scene to a second location of the virtual scene. In certain forms, the computing device includes a virtual objects database including a first virtual object not detected using the video output from the video input device and a second virtual object detected using the video output from the video input device, and wherein the second plurality of virtual objects includes the first virtual object and the second virtual object. In certain forms, the computing device simulates the virtual robot path using the first virtual object by simulating a virtual object corresponding to the industrial robot moving the first virtual object. In certain forms, each virtual object of the first plurality of virtual objects includes a plurality of virtual elements, and wherein the plurality of virtual elements includes a location of the virtual object within the virtual scene. In certain forms, the mixed reality device includes a wearable device with a transparent screen. In certain forms, simulating the virtual robot path includes outputting a visual representation of the virtual robot path with the transparent screen.

Another exemplary embodiment is a method for training an industrial robot comprising operating a mixed reality display device structured to superimpose a virtual scene on a real-world view of a real-world scene including a plurality of physical objects, a video input device structured to capture the real-world scene and output a video depicting the real-world scene, and a computing device; detecting the plurality of physical objects using the video output from the video input device, generating, with the computing device, a first plurality of virtual objects using the plurality of detected physical objects, simulating, with the computing device, a virtual robot path of an industrial robot within the real-world scene using a second plurality of virtual objects, the virtual robot path including a series of robot movements, determining, using the computing device or the mixed reality display device, one movement of the series of robot movements causes a collision between two of the virtual objects of the second plurality of virtual objects, adjusting, with the computing device, the virtual robot path so as to avoid the collision between the two virtual objects of the plurality of virtual objects, and programming the industrial robot to perform a real robot path using the adjusted virtual robot path.

In certain forms of the foregoing method, the method comprises operating a user input device structured to receive input from a user effective to cause the computing device to: add a virtual object to the virtual scene, delete a virtual object from the virtual scene, pin a virtual object to a physical object of the plurality of physical objects, output a robot path simulation to the mixed reality display device, add a virtual robot position object, generate a virtual robot path, and modify a virtual robot path. In certain forms, the computing device is structured to generate a virtual robot path and modify a virtual robot path using hand gestures or head movement captured by the user input device. In certain forms, the mixed reality display device, the video input device, and the computing device are incorporated into a single mixed reality device. In certain forms, simulating includes accessing a virtual object database configured to store the first plurality of virtual objects and the second plurality of virtual objects, and wherein one portion of the second plurality of virtual objects includes a portion of the virtual objects of the first plurality of virtual objects. In certain forms, the mixed reality display device includes a transparent screen structured to display the virtual scene aligned with the real-world scene. In certain forms, the series of movements include at least one of rotating a joint of a virtual industrial robot and moving the entire virtual industrial robot from a first location of the virtual scene to a second location of the virtual scene.

A further exemplary embodiment is a method for programming an industrial robot to move along a robot path comprising operating a mixed reality display device structured to superimpose a virtual scene on a real-world view of a real-world scene including a plurality of physical objects including an industrial robot, a video input device structured to capture the real-world scene and output a video depicting the real-world scene, and a computing device; detecting the plurality of physical objects using the video output from the video input device, generating, with the computing device, a first plurality of virtual objects using the plurality of detected physical objects, the first plurality of virtual objects including a virtual industrial robot corresponding to the industrial robot of the plurality of physical objects, simulating, with the computing device, a virtual robot path of the industrial robot within the real-world scene using a second plurality of virtual objects including the virtual industrial robot, the virtual robot path including a series of robot movements, determining, using the computing device or the mixed reality display device, one movement of the series of robot movements causes a collision between the virtual industrial robot and one of the virtual objects of the second plurality of virtual objects, manipulating, with the computing device, one of the series of robot movements so as to avoid the collision between the virtual industrial robot and one of the virtual objects of the plurality of virtual objects, and controlling the real industrial robot so as to move along a real robot path based on the adjusted virtual robot path.

In certain forms of the foregoing method, simulating includes displaying, with the mixed reality display device, the second plurality of virtual objects and the series of movements of the virtual industrial robot along the virtual robot path. In certain forms, the second plurality of virtual objects includes a portion of the first plurality of virtual objects and a third plurality of virtual objects not detected by the computing device using the video output from the video input device. In certain forms, the second plurality of virtual objects includes a virtual robot tool pinned to the physical industrial robot. In certain forms, the method comprises operating a user input device structured to receive input from a user effective to cause the computing device to: add a virtual object to the virtual scene, delete a virtual object from the virtual scene, pin a virtual object to a physical object of the plurality of physical objects, output a robot path simulation to the mixed reality display device, add a virtual robot position object, generate a virtual robot path, and modify a virtual robot path.

It is contemplated that the various aspects, features, processes, and operations from the various embodiments may be used in any of the other embodiments unless expressly stated to the contrary. Certain operations illustrated may be implemented by a computer executing a computer program product on a non-transient, computer-readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described, and that all changes and modifications that come within the spirit of the present disclosure are desired to be protected. It should be understood that while the use of words such as "preferable", "preferably", "preferred" or "more preferred" utilized in the description above indicate that the feature so described may be more desirable, it nonetheless may not be necessary, and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with, or a connection to. another item, as well as a belonging to, or a connection with, the other item as informed by the context in which it is used. The terms "coupled to," "coupled with" and the like include indirect connection and coupling, and further include but do not require a direct coupling or connection unless expressly indicated to the contrary. When the language "at least a portion" and/or "a portion" is used, the item can include a portion and/or the entire item unless specifically stated to the contrary.

What is claimed is:

1. An industrial robot training system comprising:
   a mixed reality display device structured to superimpose a virtual scene on a real-world view of a real-world scene including a plurality of physical objects;
   a video input device structured to capture the real-world scene and output a video depicting the real-world scene;
   a computing device structured to:
      detect the plurality of physical objects using the video output from the video input device,
      generate a first plurality of virtual objects using the plurality of detected physical objects,
      simulate a virtual robot path of an industrial robot within the real-world scene using a second plurality of virtual objects, the virtual robot path including a series of robot movements,
      determine one movement of the series of robot movements causes a collision between two of the virtual objects of the second plurality of virtual objects,
      adjust the virtual robot path so as to avoid the collision between the two virtual objects of the second plurality of virtual objects, and
      program the industrial robot to perform a real robot path using the adjusted virtual robot path; and
   a user input device structured to receive a plurality of inputs from a user,
   wherein the computing device is configured to add a first virtual object to the virtual scene, delete a second virtual object from the virtual scene, pin a third virtual object to a physical object of the plurality of physical objects, output a robot path simulation to the mixed reality display device, and add a virtual robot position object to the virtual scene based on the plurality of inputs.

2. The industrial robot training system of claim 1 comprising a user input device structured to receive commands from a user, and wherein the computer device is structured to simulate the virtual robot path in response to receiving commands from the user.

3. The industrial robot training system of claim 2 wherein the commands received from the user input device are effective to cause the computing device to manipulate the virtual scene output by the mixed reality display device by adding, deleting, or moving virtual objects or adding, deleting, or moving virtual robot paths, wherein moving virtual objects includes moving a joint of a virtual industrial robot or moving an entire industrial robot from a first location of the virtual scene to a second location of the virtual scene.

4. The industrial robot training system of claim 1 wherein the computing device includes a virtual objects database including a first virtual object not detected using the video output from the video input device and a second virtual object detected using the video output from the video input device, and wherein the second plurality of virtual objects includes the first virtual object and the second virtual object.

5. The industrial robot training system of claim 4 wherein the computing device simulates the virtual robot path using the first virtual object by simulating a virtual object corresponding to the industrial robot moving the first virtual object.

6. The industrial robot training system of claim 1 wherein each virtual object of the first plurality of virtual objects includes a plurality of virtual elements, and wherein the plurality of virtual elements includes a location of the virtual object within the virtual scene.

7. The industrial robot training system of claim 1 wherein the mixed reality device includes a wearable device with a transparent screen.

8. The industrial robot training system of claim 7 wherein simulating the virtual robot path includes outputting a visual representation of the virtual robot path with the transparent screen.

9. A method for training an industrial robot comprising:
operating a mixed reality display device structured to superimpose a virtual scene on a real-world view of a real-world scene including a plurality of physical objects, a video input device structured to capture the real-world scene and output a video depicting the real-world scene, and a computing device;
receiving from a user input device a plurality of inputs from a user effective to cause the computing device to: add a virtual object to the virtual scene, delete the virtual object from the virtual scene, pin the virtual object to a physical object of the plurality of physical objects, output a robot path simulation to the mixed reality display device, and add a virtual robot position object to the virtual scene based on the plurality of inputs;
detecting the plurality of physical objects using the video output from the video input device;
generating, with the computing device, a first plurality of virtual objects using the plurality of detected physical objects;
simulating, with the computing device, a virtual robot path of an industrial robot within the real-world scene using a second plurality of virtual objects, the virtual robot path including a series of robot movements;
determining, using the computing device or the mixed reality display device, one movement of the series of robot movements causes a collision between two of the virtual objects of the second plurality of virtual objects;
adjusting, with the computing device, the virtual robot path so as to avoid the collision between the two virtual objects of the plurality of virtual objects; and
programming the industrial robot to perform a real robot path using the adjusted virtual robot path.

10. The method of claim 9 wherein the computing device is structured to generate the virtual robot path and modify the virtual robot path using hand gestures or head movement captured by the user input device.

11. The method of claim 9 wherein the mixed reality display device, the video input device, and the computing device are incorporated into a single mixed reality device.

12. The method of claim 9 wherein simulating includes accessing a virtual object database configured to store the first plurality of virtual objects and the second plurality of virtual objects, and wherein the second plurality of virtual objects includes at least a portion of the virtual objects of the first plurality of virtual objects.

13. The method of claim 9 wherein the mixed reality display device includes a transparent screen structured to display the virtual scene aligned with the real-world scene.

14. The method of claim 9 wherein the series of movements include at least one of rotating a joint of a virtual industrial robot and moving the entire virtual industrial robot from a first location of the virtual scene to a second location of the virtual scene.

15. A method for programming an industrial robot to move along a robot path comprising:
operating a mixed reality display device structured to superimpose a virtual scene on a real-world view of a real-world scene including a plurality of physical objects including an industrial robot, a video input device structured to capture the real-world scene and output a video depicting the real-world scene, and a computing device;
receiving from a user input device a plurality of inputs effective to cause the computing device to: add a first virtual object to the virtual scene, delete a second virtual object from the virtual scene, pin a third virtual object to a physical object of the plurality of physical objects, output a robot path simulation to the mixed reality display device, and add a virtual robot position object to the virtual scene based on the plurality of inputs;
detecting the plurality of physical objects using the video output from the video input device,
generating, with the computing device, a first plurality of virtual objects using the plurality of detected physical objects, the first plurality of virtual objects including a virtual industrial robot corresponding to the industrial robot of the plurality of physical objects,
simulating, with the computing device, a virtual robot path of the industrial robot within the real-world scene using a second plurality of virtual objects including the virtual industrial robot, the virtual robot path including a series of robot movements,
determining, using the computing device or the mixed reality display device, one movement of the series of robot movements causes a collision between the virtual industrial robot and one of the virtual objects of the second plurality of virtual objects,
manipulating, with the computing device, one of the series of robot movements so as to avoid the collision between the virtual industrial robot and one of the virtual objects of the plurality of virtual objects, and
controlling the real industrial robot so as to move along a real robot path based on the adjusted virtual robot path.

16. The method of claim 15 wherein simulating includes displaying, with the mixed reality display device, the second plurality of virtual objects and the series of movements of the virtual industrial robot along the virtual robot path.

17. The method of claim 16 wherein the second plurality of virtual objects includes a portion of the first plurality of virtual objects and a third plurality of virtual objects not detected by the computing device using the video output from the video input device.

18. The method of claim 15 wherein the second plurality of virtual objects includes a virtual robot tool pinned to the physical industrial robot.

\* \* \* \* \*